(12) United States Patent
Shaefer

(10) Patent No.: US 10,808,867 B1
(45) Date of Patent: Oct. 20, 2020

(54) CORD RESTRAINT

(71) Applicant: Mark McNair Shaefer, Augusta, GA (US)

(72) Inventor: Mark McNair Shaefer, Augusta, GA (US)

( * ) Notice: Subject to any disclaimer, the term of this patent is extended or adjusted under 35 U.S.C. 154(b) by 0 days.

(21) Appl. No.: 15/904,767

(22) Filed: Feb. 26, 2018

(51) Int. Cl.
| | |
|---|---|
| *F16L 3/00* | (2006.01) |
| *F16L 3/04* | (2006.01) |
| *H02G 3/04* | (2006.01) |
| *F16L 3/06* | (2006.01) |

(52) U.S. Cl.
CPC ........... *F16L 3/04* (2013.01); *F16L 3/06* (2013.01); *H02G 3/04* (2013.01)

(58) Field of Classification Search
CPC .................. H01R 13/6395; H01R 25/006
USPC ................... 248/63, 65, 74.3; 439/373, 501
See application file for complete search history.

(56) References Cited

U.S. PATENT DOCUMENTS

| | | | | |
|---|---|---|---|---|
| 3,930,116 | A * | 12/1975 | Richards | H01R 13/60 174/66 |
| 4,508,933 | A * | 4/1985 | Carvel | H05K 5/03 174/67 |
| 5,184,792 | A | 2/1993 | Bernhard et al. | |
| 5,547,390 | A | 8/1996 | Laherty | |
| 5,989,052 | A * | 11/1999 | Fields | H01R 13/447 439/144 |
| 6,805,580 | B2 * | 10/2004 | Piedmont | H01R 13/447 174/66 |
| 7,188,814 | B2 | 3/2007 | Davis | |
| 7,255,588 | B2 | 8/2007 | Wilder | |
| 7,712,709 | B2 | 5/2010 | Winchester | |
| 7,997,773 | B2 | 8/2011 | Kraus et al. | |
| 8,021,174 | B1 * | 9/2011 | Schutte | H01R 13/6392 439/144 |
| 8,070,111 | B1 | 12/2011 | Zeller | |
| 8,203,077 | B2 | 6/2012 | Honeycutt et al. | |
| 9,350,151 | B2 | 5/2016 | Michaelis, IV | |
| 9,653,898 | B1 | 5/2017 | Deaton et al. | |
| 2011/0039446 | A1 | 2/2011 | Maass | |
| 2011/0237114 | A1 | 8/2011 | Beene et al. | |
| 2012/0225578 | A1 | 9/2012 | Adams | |
| 2014/0322959 | A1 * | 10/2014 | Garofalo | H01R 13/6395 439/373 |

FOREIGN PATENT DOCUMENTS

GB      2500223 A     9/2013

* cited by examiner

*Primary Examiner* — Steven M Marsh
(74) *Attorney, Agent, or Firm* — Jacob W Neu; Bradley Arant Boult Cummings LLP

(57) ABSTRACT

A cord restraint is disclosed herein. The cord restraint has a plate for securing to the wall. A hook and a brace are secured to the face of the plate. The hook is positioned above the brace. To restrain a cord, a user first forms a loop in the cord, passes it through the brace, and then pulls it downward over the hook to be secured. This prevents the cord from being inadvertently pulled out of an electrical socket if the free end of the cord is pulled.

7 Claims, 2 Drawing Sheets

CORD RESTRAINT

FIELD OF INVENTION

The invention is in the field of electrical accessories and restraints.

BACKGROUND OF INVENTION

Electrical cords, extension cords, and similar types of utility cords are used to power equipment, tools, and machinery. However, without some form of restraint, it is common for such cords to accidentally become unplugged from a standard wall electrical socket when, for example, someone accidentally trips over the cord, or the cord is pulled too far away from the electrical socket. Cords pulled out in this fashion can be a nuisance to have to plug back in. Additionally, if the plug is only partially pulled out, thereby exposing the metal prongs of the plug while remaining connected to the socket, a fire or electrocution hazard can result.

What is needed then, is a device for keeping the cord plug plugged into the electrical socket during use, even if subject to pulling forces that would typically result in the plug coming unplugged.

SUMMARY OF INVENTION

In some respects, the apparatus disclosed herein concerns an electrical cord restraint having a plate securable to a wall and adjacent to an electrical socket, a hook secured to the plate with the open portion of the hook facing upward, and a brace secured to the plate below the hook and sized to allow a loop of cord to slide through.

In other respects, the disclosure concerns a method for restraining an electrical cord, the method having the steps of securing a restraint to a wall in a location near an electric socket, the restraint comprising a plate, a hook secured to the plate with the open portion of the hook facing upward, and a brace secured to the plate below the hook; forming a loop in an electrical cord; passing the loop upward through the brace until the loop passes over the hook; and pulling the loop downward over the hook.

BRIEF DESCRIPTION OF DRAWINGS

It should be noted that identical features in different drawings are shown with the same reference numeral.

DETAILED DESCRIPTION

Figure 1:
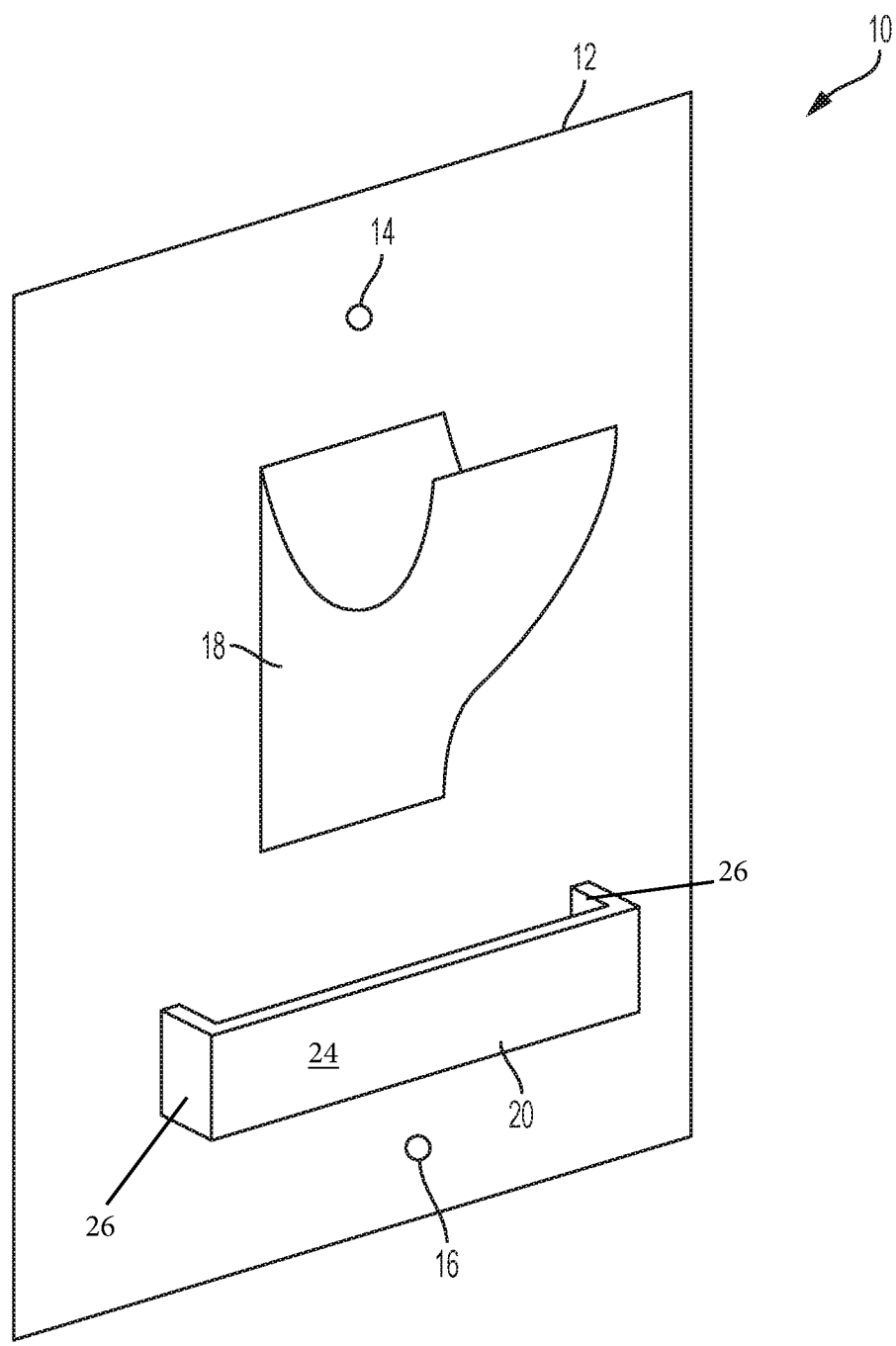
FIG. 1 is a front perspective view of one embodiment of the cord restraint disclosed in this specification.

FIG. 1 depicts a front perspective view of the restraint 10 according to one embodiment of the apparatus. The restraint 10 has a plate 12 for attaching to the wall and supporting the other elements on the plate 12. The embodiment shown in FIG. 1 has screw holes 14 and 16 for attaching the plate 12 to the wall. However, other methods of attachment (e.g., glue, tape, hook-and-loop fasteners, a hook for hanging onto the wall or a protrusion thereof, etc.) for securing the plate 12 to the wall may also be used.

A hook 18 protrudes from the center of the plate 12. The hook 18 has a concave rounded top edge to create a depression, wherein a loop of the cord may be pulled tight over and through the depression to secure it. The hook 18 is permanently secured to the plate 12. For example, the hook 18 may be integrated into the plate 12 and be of the same material, such as formed by a mold or extrusion process. Alternatively, the hook 18 may be a separate element that is attached by a screw, bolt, adhesive bonding, or other permanent attachment mechanism to the plate 12.

A brace 20 is attached to the plate 12 below the hook 18. The brace 20 is a bar 24 extending laterally across the face of the plate 12 and a set a small distance apart from the plate 12, and attached to the plate 12 by legs 26 on either end of the bar 24. The brace 20 may be rigid or somewhat flexible. The brace should be secured to the plate 12 to prevent it from coming off during routine forces, such as those that may occur when a cord is pulled. The brace 20 may be integrated into the plate 12 and be of the same material, such as formed by a mold or extrusion process. Alternatively, the brace 20 may be a separate element that is attached by a screw, bolt, adhesive bonding, or other permanent attachment mechanism to the plate 12. In the embodiment shown in FIG. 1, the brace 20 is rigid and integrally attached to the plate 12.

The distance between the bar 24 of the brace 20 and the plate 12 is at least one diameter of an extension cord to be restrained. The distance between the two legs 26 of the brace 20 should be wider than two diameters of an extension cord for which the restraint 10 is designed to restrain. Because cords may be of different thicknesses, the restraint 10 may be designed for particular sizes of cords, or alternatively the brace 20 may be large enough to permit use with cords of any routine or custom diameter. For larger cords, the hook 18 may also need to be made larger so that the depression can receive the cord as well.

Figure 2:
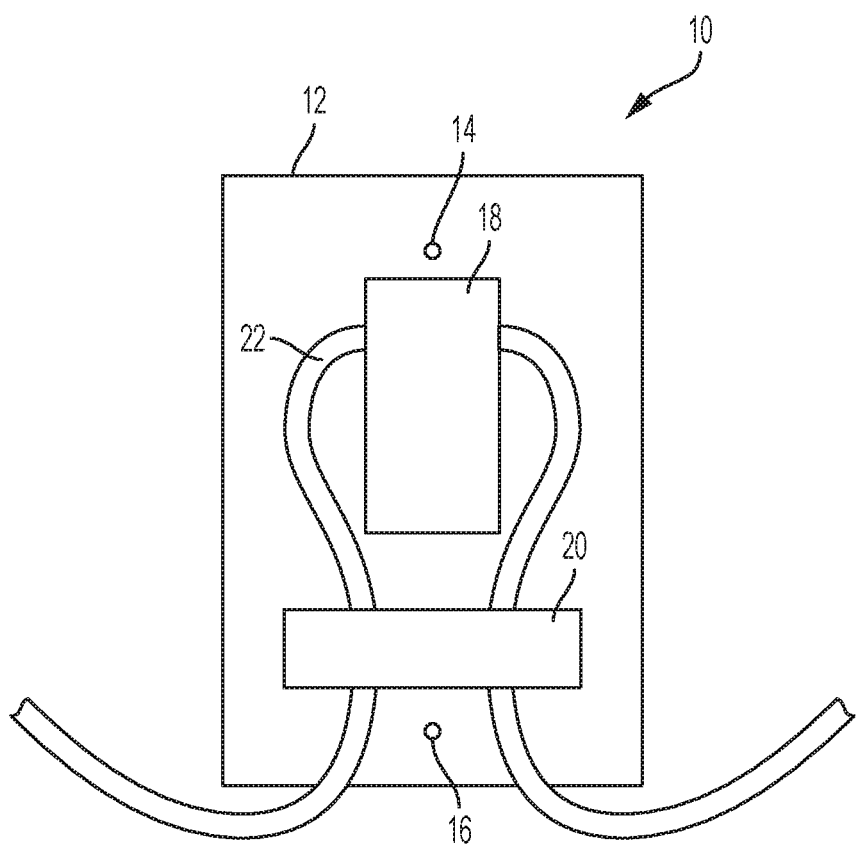
FIG. 2 is a front elevation view of the embodiment of FIG. 1, showing the cord within the restraint.

FIG. 2 depicts a front elevation view of the embodiment of FIG. 1, with a cord 22 implemented in the restraint 10. In order to insert the cord 22 into the restraint 10, the user first creates a loop in the cord and holds the two ends of the cord 22 at the bottom of the loop. The user then inserts the loop of the cord through the space between the brace 20 and the plate 12. The user continues to push the loop upward until it maneuvers around and over the hook 18. Once the loop goes over the hook 18, the user pulls the ends of the loop downward through the brace 20 to secure the loop in the depression of the hook 18. The cord 22 then appears as it is shown in FIG. 2, wherein the cord 22 runs from the electrical plug to the restraint 10, passes through the brace 20 going upward over and around the hook 18, and then passes back downward through the brace 20. The cord 22 then continues on to wherever it is being used. By forming a loop over the hook and restrained by the brace, the pulling forces on the remainder of the cord 22 are transferred to the brace 20 or hook 18, thereby preventing the cord 22 from being pulled further and ultimately resulting in the cord 22 being pulled out of the electrical socket.

Once the cord 22 is no longer being used, the user grabs the portions of the cord 22 below the brace 20 and pushes them upward, thereby removing the loop of the cord 22 out of the hook 18. The user maneuvers the loop around the hook 18 by bending the top of the loop forward, and then pulls down such that the loop slips through the brace 20 and comes free. The cord 22 may then be moved to the next location or placed in storage.

Preferably, the restraint 10 is place near or adjacent to an electrical socket. This allows for a maximal length of the cord 22 to be used after passing through the restraint 10. It also minimizes the amount of cord 22 that runs from the electrical socket to the restraint 10. If there is an accidental or inadvertent force applied to the portion of the cord 22 between the socket and restraint 10, the cord will still be unplugged from the socket. Therefore, the distance should be minimized. However, this is not necessary for the restraint 10 to operate, and it can be located anywhere where it can be secured to a wall.

While the invention has been described with respect to a limited number of embodiments, those skilled in the art, having benefit of this disclosure, will appreciate that other embodiments can be devised which do not depart from the scope of the invention as disclosed here.

An exemplary non-exhaustive and alternative embodiment of the invention described herein may be more particularly described as follows, which is not intended to limit the scope of the foregoing disclosure and the ability to adopt variants and alternative claims that may be broader in scope.

I claim:

1. An electrical cord restraint comprising: a plate securable to a wall and adjacent to an electrical socket, a hook secured to the plate with an open portion of the hook facing upward, and a brace comprising a bar attached to the plate by a leg on each end of the bar, wherein the brace and the plate define a closed aperture, the aperture sized to allow a loop of cord to slide through.

2. The restraint of claim 1, wherein the hook and plate are integrated to form a single body.

3. The restraint of claim 1 wherein the brace and plate are integrated to form a single body.

4. The restraint of claim 3, wherein the hook, brace, and plate are integrated to form a single body.

5. The restraint of claim 1, wherein the plate is securable to the wall by screws.

6. A method for restraining an electrical cord, the method comprising:
   (a) securing a restraint to a wall in a location near an electric socket, the restraint comprising a plate, a hook secured to the plate with an open portion of the hook facing upward, and a brace comprising a bar attached to the plate by a leg on each end of the bar, such that the brace and plate define a closed aperture;
   (b) forming a loop in an electrical cord;
   (c) passing the loop upward through the aperture until the loop passes over the hook; and
   (d) pulling the loop downward over the hook.

7. An electrical cord restraint comprising: a plate, a hook secured to the plate with an open portion of the hook facing in a first direction, and a brace positioned relative to the hook in a direction opposite from the first direction and comprising a bar attached to the plate by a leg on each end of the bar to define a closed aperture, the aperture sized to allow a loop of cord to slide through.

* * * * *